(12) United States Patent
Hyde et al.

(10) Patent No.: US 7,903,334 B2
(45) Date of Patent: Mar. 8, 2011

(54) REFRACTIVE BOUNDARY ELEMENTS, DEVICES, AND MATERIALS

(75) Inventors: Roderick A. Hyde, Livermore, CA (US); Nathan P. Myhrvold, Medina, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 55 days.

(21) Appl. No.: 12/315,759

(22) Filed: Dec. 5, 2008

(65) Prior Publication Data

US 2009/0135088 A1 May 28, 2009

(51) Int. Cl.
*G02B 27/28* (2006.01)
*G02B 5/30* (2006.01)

(52) U.S. Cl. ........................................ 359/497; 359/494
(58) Field of Classification Search .................. 359/500, 359/494, 497
See application file for complete search history.

(56) References Cited

U.S. PATENT DOCUMENTS

| | | | |
|---|---|---|---|
| 4,582,655 A | 4/1986 | Greener | |
| 4,822,149 A * | 4/1989 | Kubick | ........................ 359/315 |
| 6,052,495 A | 4/2000 | Little et al. | |
| 6,411,752 B1 | 6/2002 | Little et al. | |
| 6,603,113 B2 | 8/2003 | Numai | |
| 6,667,095 B2 | 12/2003 | Wheatley et al. | |
| 6,800,378 B2 | 10/2004 | Hawa et al. | |
| 6,831,722 B2 | 12/2004 | Ishikawa et al. | |
| 2003/0227415 A1 | 12/2003 | Joannopoulos et al. | |
| 2005/0207722 A1 * | 9/2005 | Hyde | ........................ 385/141 |

FOREIGN PATENT DOCUMENTS

WO   WO 0048026 A1   8/2000

OTHER PUBLICATIONS

U.S. Appl. No. 11/607,521, Hyde et al.
U.S. Appl. No. 11/607,261, Hyde et al.
U.S. Appl. No. 10/802,100, Roderick A. Hyde.
Houck, Brock, and Chuang, "Experimental Observations of a Left-Handed Material That Obeys Snell's Law," Physical Review Letters, No. 13, Apr. 4, 2003, Doc No. 137401 (pp. 1-4).
Liu, Shakouri, and Bowers, "Wide Tunable Double Ring Resonator Coupled Lasers," IEEE Photonics Technology Letters, vol. 14, No. 5, May 2002, pp. 600-602.
Liu, Zheng; "Negative Refraction and Omnidirectional Total Transmission at a Planar Interface Associated with a Uniaxial Medium," Physical Review B 69, Mar. 4, 2004, Doc. No. 115402 , 6 pp.
Pendry, J.B., "Negative Refraction Makes a Perfect Lens," Physical Review Letters, No. 18, Oct. 30, 2000, pp. 3966-3969.
Shelby, Smith, and Schultz, "Experimental Verification of a Negative Index of Refraction," Science, vol. 292, Apr. 6, 2001, pp. 77-79.

(Continued)

*Primary Examiner*—Joshua L Pritchett

(57) ABSTRACT

An optical device includes an interface between two or more media. The refractive indices, orientations of media, and alignment relative to a propagating wave define a refractive boundary at which reflections may be reduced or eliminated, and at which, for certain incident angles, rays may be refracted on the same side of the normal as the incident ray.

13 Claims, 13 Drawing Sheets

OTHER PUBLICATIONS

Zhang, Fluegel and Mascarenhas, "Total Negative Refraction in Real Crystals for Ballistic Electrons and Light," Physical Review Letters, No. 15, Oct. 10, 2003, Doc. No. 157404 (pp. 1-4).
Abdulhalim, I.; "Exact 2×2 matrix method for the transmission and reflection at the interface between two arbitrarily oriented biaxial crystals"; J. Opt. A.: Pure Appl. Opt. 1; bearing dates of Jan. 19, 1999 and Jul. 28, 1999; pp. 655-661; vol. 1; IOP Publishing Ltd.
European Patent Office Search Report Under Article 153(7) EPC; App. No. EP 05725628.1; Sep. 1, 2010; pp. 1-3 (received by our agent on Oct. 22, 2010).

* cited by examiner

REFRACTIVE BOUNDARY ELEMENTS, DEVICES, AND MATERIALS

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications"); the present application also claims the earliest available effective filing date(s) from, and also incorporates by reference in its entirety all subject matter of any and all parent, grandparent, great-grandparent, etc. applications of the Related Application(s) The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

RELATED APPLICATIONS

1. United States patent application entitled REFRACTIVE BOUNDARY ELEMENTS, DEVICES, AND MATERIALS, U.S. Ser. No. 11/607,261, naming Roderick A. Hyde, Nathan P. Myhrvold and Clarence T. Tegreene as inventors, filed 1 Dec. 2006, which claims the benefit of U.S. patent application Ser. No. 10/959,929 filed on Oct. 17, 2004, which claims the benefit of U.S. patent application Ser. No. 10/802,100 filed 16 Mar. 2004.
2. United States patent application entitled REFRACTIVE BOUNDARY ELEMENTS, DEVICES, AND MATERIALS, U.S. Ser. No. 12/228,555, naming Roderick A. Hyde, Nathan P. Myhrvold and Clarence T. Tegreene as inventors, filed 13 Aug. 2008, which claims the benefit of U.S. patent application Ser. No. 10/959,929 filed on Oct. 17, 2004, which claims the benefit of U.S. patent application Ser. No. 10/802,100 filed 16 Mar. 2004.

TECHNICAL FIELD

The present invention relates to elements, methods, or materials for refraction.

BACKGROUND

One common type of refraction is the bending of the path of a lightwave as it crosses a boundary between two media. In conventional optics, Snell's law gives the relationship between the angles of incidence and refraction for wave crossing the boundary:

$$n_1 \sin(\theta_1) = n_2 \sin(\theta_2).$$

This relationship is shown in FIG. 1, where a ray 100 in a first medium 101 arrives at a boundary 102 at an angle $\theta_1$, as referenced to the normal 104. As the ray 100 crosses the boundary 102, the ray 100 is bent so that it continues propagating as a refracted ray 106 at an angle $\theta_2$.

While this relatively simple ray optics presentation of refraction is widely accepted, a more thorough examination of refraction involves consideration of propagation of electromagnetic waves and considerations of energy reflected at a boundary. FIG. 2A represents this diagrammatically with an incident wave 108 crossing a boundary 110. A portion of the energy is reflected as represented by the wave 112 and a portion of the energy propagates as a transmitted wave 114. As represented by the spacing between the waves, the wavelength of the transmitted wave 114 is shorter than that of the incident wave 108, indicating that the refractive index $n_2$ experienced by the transmitted wave 114 is higher than the refractive index $n_1$ experienced by the incident wave 108.

As indicated by the figures and by Snell's law, a lightwave traveling from a lower index of refraction to a higher index of refraction will be bent toward the normal at an angle determined by the relative indices of refraction. For this system, in a conventional analysis, the range of refracted angles relative to the normal is typically confined to a range from 0 degrees to a maximum angle determined by an angle of total reflection. Additionally, the amount of light energy reflected at the boundary is a function of the relative indices of refraction of the two materials.

More recently, it has been shown that under certain limited conditions, rays traveling across a boundary may be refracted on the same side of the normal as the incident ray in a phenomenon called "negative refraction." Some background on the developments can be found in Pendry, "Negative Refraction Makes a Perfect Lens," Physical Review Letters, Number 18, Oct. 30, 2000, 3966-3969; Shelby, Smith, and Schultz, "Experimental Verification of a Negative Index of Refraction," Science, Volume 292, Apr. 6, 2001, 77-79; Houck, Brock, and Chuang, "Experimental Observations of a Left-Handed Material That Obeys Snell's Law," Physical Review Letters, Number 13, Apr. 4, 2003, 137401-(1-4); each of which is incorporated herein by reference. With particular reference to negative refraction, Zhang, Fluegel and Mascarenhas have demonstrated this effect at a boundary between two pieces of $YVO_4$ crystal, where the pieces of crystal are rotated such that the ordinary axis of the first piece is parallel to the extraordinary axis of the second piece. This demonstration was presented in Zhang, Fluegel and Mascarenhas, "Total Negative Refraction in Real Crystals for Ballistic Electrons and Light," Physical Review Letters, Number 15, Oct. 10, 2003, 157404-(1-4), which is incorporated herein by reference. FIG. 2B shows the interface, the relative axes and the nomenclature used in the descriptions herein for the case of positive refraction. FIG. 2C shows the same aspects for negative refraction.

The $YVO_4$ crystal treated by Zhang, et al., is an example of an anisotropic crystal whose dielectric permittivity is defined by the matrix, $$\begin{pmatrix} \varepsilon_o & 0 & 0 \\ 0 & \varepsilon_e & 0 \\ 0 & 0 & \varepsilon_z \end{pmatrix}$$

and where $\in_o$, $\in_e$, and $\in_z$ are not all the same. In general, the refractive index n of a medium is related to the dielectric permittivity $\in$ as, $$n=c\sqrt{\mu\in},$$

where μ is the magnetic permeability of the medium.

A more general case, described by Zheng Liu, et al., NEGATIVE REFRACTION AND OMNIDIRECTIONAL TOTAL TRANSMISSION AT A PLANAR INTERFACE ASSOCIATED WITH A UNIAXIAL MEDIUM, Phys. Review B (115402), dated Mar. 4, 2004, bearing submission date Oct. 13, 2003, relates to an interface between a uniaxial medium and a second medium and is incorporated herein by reference. Liu describes the propagation of waves through uniaxial and isotropic materials to demonstrate reflectionless refraction at an interface between two uniaxial materials or between a uniaxial material and an isotropic material.

SUMMARY

In an optical element having materials of differing properties, the material properties may define an interface or other transition that may refract light traveling through the materials. In one aspect, the element may include two or more materials that define one or more boundaries. The material properties and/or orientation may be selected to establish refraction at the boundary. In one aspect, the material properties are refractive indices or dielectric constants. The properties may be selected so that refraction at the boundary is substantially reflectionless.

In one approach, materials are selected to define a boundary. The materials are selected with refractive indices that are related according to the geometric means of their constituents. In one approach, the constituents are ordinary and extraordinary indices of refraction. In one approach, at least one of the materials is an anisotropic material. In one approach two or more of the materials are anisotropic. In one approach one or more of the materials is anisotropic according to its index of refraction. Where one or more of the materials is anisotropic, the anisotropic materials are oriented such that the following boundary conditions are satisfied by a wave incident on the boundary:

$$\hat{z}\cdot\overline{H}_1 = \hat{z}\cdot\overline{H}_2$$

$$\hat{y}\cdot\overline{E}_1 = \hat{y}\cdot\overline{E}_2$$

$$\hat{y}\cdot\overline{k}_1 = \hat{y}\cdot\overline{k}_2$$

In one approach, the materials have dielectric constants and orientations that satisfy the relationship:

$$\beta_1\varepsilon_1^2 = \beta_2\varepsilon_2^2$$

$$\sqrt{\beta_1}\cos^2\phi_1 + \frac{1}{\sqrt{\beta_1}}\sin^2\phi_1 = \sqrt{\beta_2}\cos^2\phi_2 + \frac{1}{\sqrt{\beta_2}}\sin^2\phi_2$$

In one case, one or more of the materials is a biaxial material. In addition to the foregoing, various other method and/or system aspects are set forth and described in the text (e.g., claims and/or detailed description) and/or drawings of the present application.

The foregoing is a summary and thus contains, by necessity; simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

DETAILED DESCRIPTION

Figure 3:
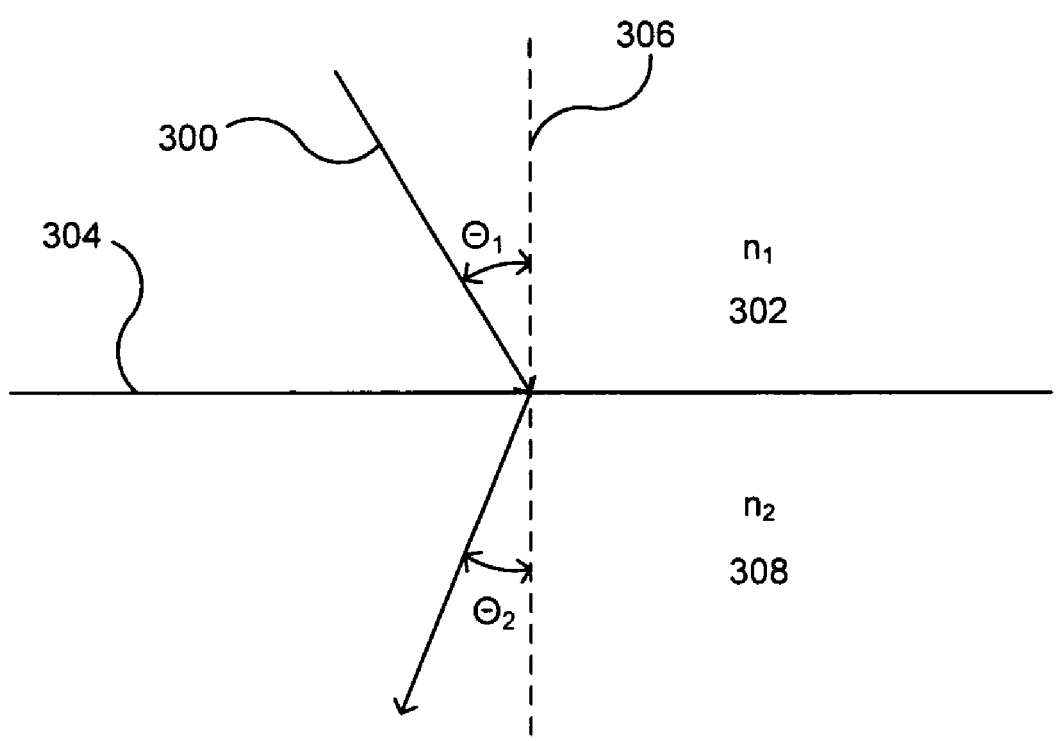
FIG. 3 is a representation of a wave propagating across the boundary between two different media having equivalent geometric means of their ordinary and extraordinary indices of refraction.

As shown in FIG. 3, a first ray 300 travels through a first medium 302 with a first index of refraction $n_1$ at an angle $\theta_1$ relative to a normal 306. The index of refraction $n_1$ that ray 300 sees may depend on the ordinary and extraordinary indices of refraction of the medium, and also upon the angle the ray 300 makes with the ordinary axis ô and extraordinary axis ê if the medium is anisotropic in the $\hat{x},\hat{y}$ plane, as defined below. The ray 300 arrives at a boundary 304 between the first medium 302 and a second medium 308. As the ray 300 crosses the boundary 304, it is refracted at an angle $\theta_2$ that is a function of the index of refraction $n_2$ of the second medium 308, where again, $n_2$ depends on the ordinary and extraordinary indices of refraction of the medium, and also depends on the angle the ray 300 makes with the ordinary and extraordinary axes î and ê if the medium is anisotropic in the $\hat{x},\hat{y}$ plane. While the angle of refraction is shown as negative, the discussion herein may be related equally to positive refraction in most cases.

The following discussion assumes one of the principal axes of the first medium 302 (defined to be $\hat{z}_1$) is aligned with one of the principal axes of the second medium 308 (defined to $\hat{z}_2$). A further condition for purposes of this exemplary discussion is that this common direction (defined as $\hat{z}_1=\hat{z}_2=\hat{z}$) lies in the plane of the interface between the two media 302, 308. A Cartesian basis set ($\hat{x},\hat{y},\hat{z}$) can be defined such that $\hat{x}$ is perpendicular to the plane of the boundary 304, and the vectors $\hat{y}$ and $\hat{z}$ are parallel to it. The ordinary axis ô and extraordinary axis ê experienced by the ray 300 are also in the $\hat{x},\hat{y}$ plane. (It is important to note that, although ô and ê are used to represent an ordinary and extraordinary axis, this is not meant to imply a uniaxial material; the dielectric constant in the $\hat{z}$ direction can be almost anything depending upon the conditions to be satisfied.) For the structure described for this exemplary embodiment, light rays that experience positive refraction, negative refraction and/or reflectionless refraction travel in the $\hat{x},\hat{y}$ plane and are also polarized so that the electric displacement $\overline{D}$ lies in the $\hat{x},\hat{y}$ plane and the magnetic field $\overline{H}$ lies in the $\hat{z}$ direction. This configuration is structured to allow simplified discussion of refraction confined to the $\hat{x},\hat{y}$ plane and should not be considered to be limiting.

Note that the indices of refraction $n_1$, $n_2$ may be simplifications of the actual index of refraction, because the index of refraction of each medium may depend upon the direction of the wave traveling through the medium. For example, if the first medium 302 is an anisotropic medium, the index of refraction $n_1$ experienced by a wave traveling through the medium may depend upon an ordinary component $n_{1o}$ and an extraordinary component $n_{1e}$. Similarly, if the second medium is an anisotropic medium, it may also have ordinary and extraordinary indices $n_{2o}$, $n_{2e}$. On the other hand, if the medium is isotropic, the ordinary and extraordinary indices of refraction will be the same.

In a simplified case where the first and second media 302, 308 are the same isotropic material, the index of refraction experienced by a propagating wave will remain constant across the boundary and the wave will propagate un-refracted. Additionally, because the refractive index does not change, no energy will be reflected at the boundary.

In a slightly more complex case, similar to that of the Zhang paper, the first and second media may be the same anisotropic material. It has been shown by Zhang et al., that if certain conditions are met, the amount of energy reflected at the boundary will be zero for identical anisotropic materials when the materials are rotated relatively such that the ordinary axis of the first media 302 is inclined at the negative of the angle defined by the ordinary axis of the second media 308. However, because a given polarization component of the wave experiences a change in index of refraction, the lightwave will be refracted.

In the more general case similar to that described in Zheng, the media 302, 308 on either side of the boundary 304 of FIG. 3 are not limited to identical, anisotropic media. In one case, the first material 302 is isotropic in the $\hat{x},\hat{y}$ plane, having equal ordinary and extraordinary indices of refraction $n_{1o}$, $n_{1e}$. The second medium 308 is anisotropic in the $\hat{x},\hat{y}$ plane, having an ordinary index of refraction $n_{2o}$ different from its extraordinary index of refraction $n_{2e}$.

For the case where the first medium 302 is isotropic in the $\hat{x},\hat{y}$ plane and the second medium 308 is anisotropic in the $\hat{x},\hat{y}$ plane, the indices of refraction of the two media 302, 308 are related by their geometric mean according to the relationship:

$$n_1 = \sqrt{n_{2o} \cdot n_{2e}}$$

In this embodiment, the magnetic permeability μ of both media is a) the same in both media, and b) isotropic in both media. Defining the permittivities by, $$\epsilon_{1o} = \epsilon_1, \epsilon_{1e} = \beta_1 \epsilon_1, \epsilon_{2o} = \epsilon_2, \epsilon_{2e} = \beta_2 \epsilon_2$$

then the permittivities (for the case where the first medium 302 is isotropic in the $\hat{x},\hat{y}$ plane and the second medium 308 is anisotropic in the $\hat{x},\hat{y}$ plane) are related as, $$\epsilon_1 = \sqrt{\beta_2 \epsilon_2^2}$$

This relationship can be derived by satisfying certain boundary conditions and a dispersion relation for zero reflected energy.

The fields in each material must satisfy Maxwell's relations. These lead to standard expressions for the fields and a dispersion relation for the wave vector:

$$\overline{H} = H\hat{z}$$

$$\overline{E} = \frac{kH}{\omega \epsilon}\left\{\hat{e}\frac{\sin\varphi}{\beta} - \hat{o}\cos\varphi\right\}$$

$$k^2 = \mu\epsilon\omega^2 \cdot \frac{\beta}{\beta\cos^2\varphi + \sin^2\varphi}$$

Where, for an anisotropic material, the electric field $\overline{E}$ is related to the electric displacement $\overline{D}$ and the dielectric tensor $\epsilon_{x,y}$ by:

$$\begin{pmatrix} D_x \\ D_y \\ D_z \end{pmatrix} = \begin{pmatrix} \epsilon_{xx} & \epsilon_{xy} & \epsilon_{xz} \\ \epsilon_{yx} & \epsilon_{yy} & \epsilon_{yz} \\ \epsilon_{zx} & \epsilon_{zy} & \epsilon_{zz} \end{pmatrix} \begin{pmatrix} E_x \\ E_y \\ E_z \end{pmatrix}.$$

Figure 1:
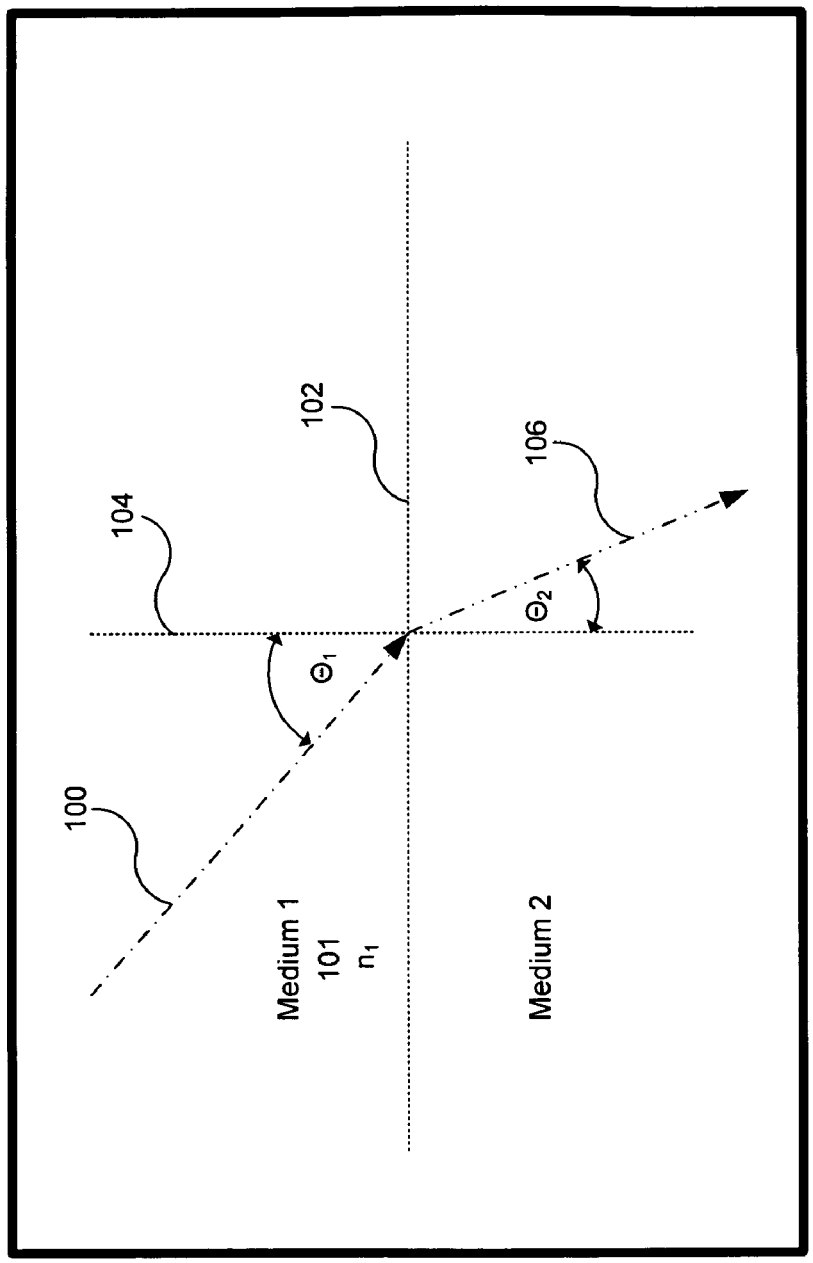
FIG. 1 is a ray diagram showing propagation of a light ray across a boundary between two media.
Figure 2A:
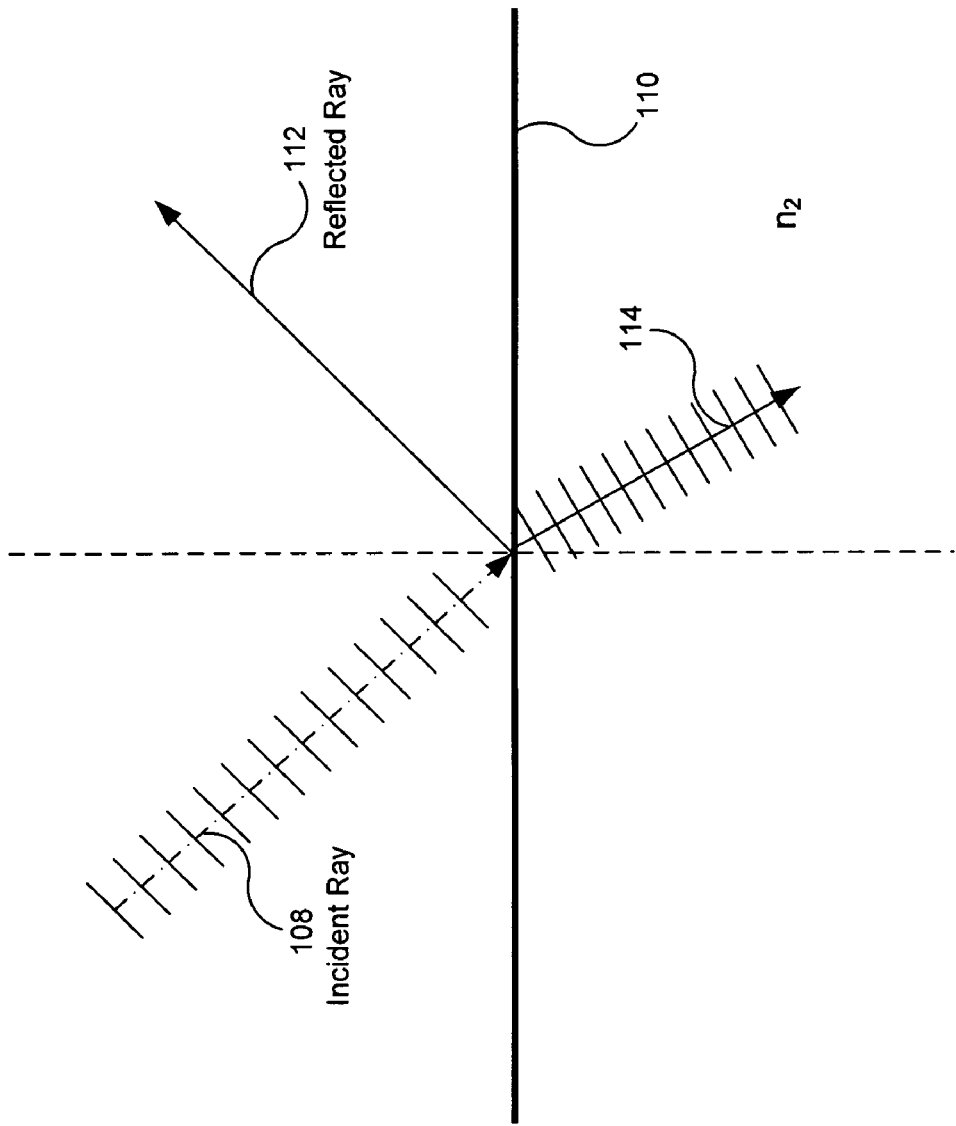
FIG. 2A is a propagation diagram showing propagation and reflection of a wave at a boundary.
Figure 2B:
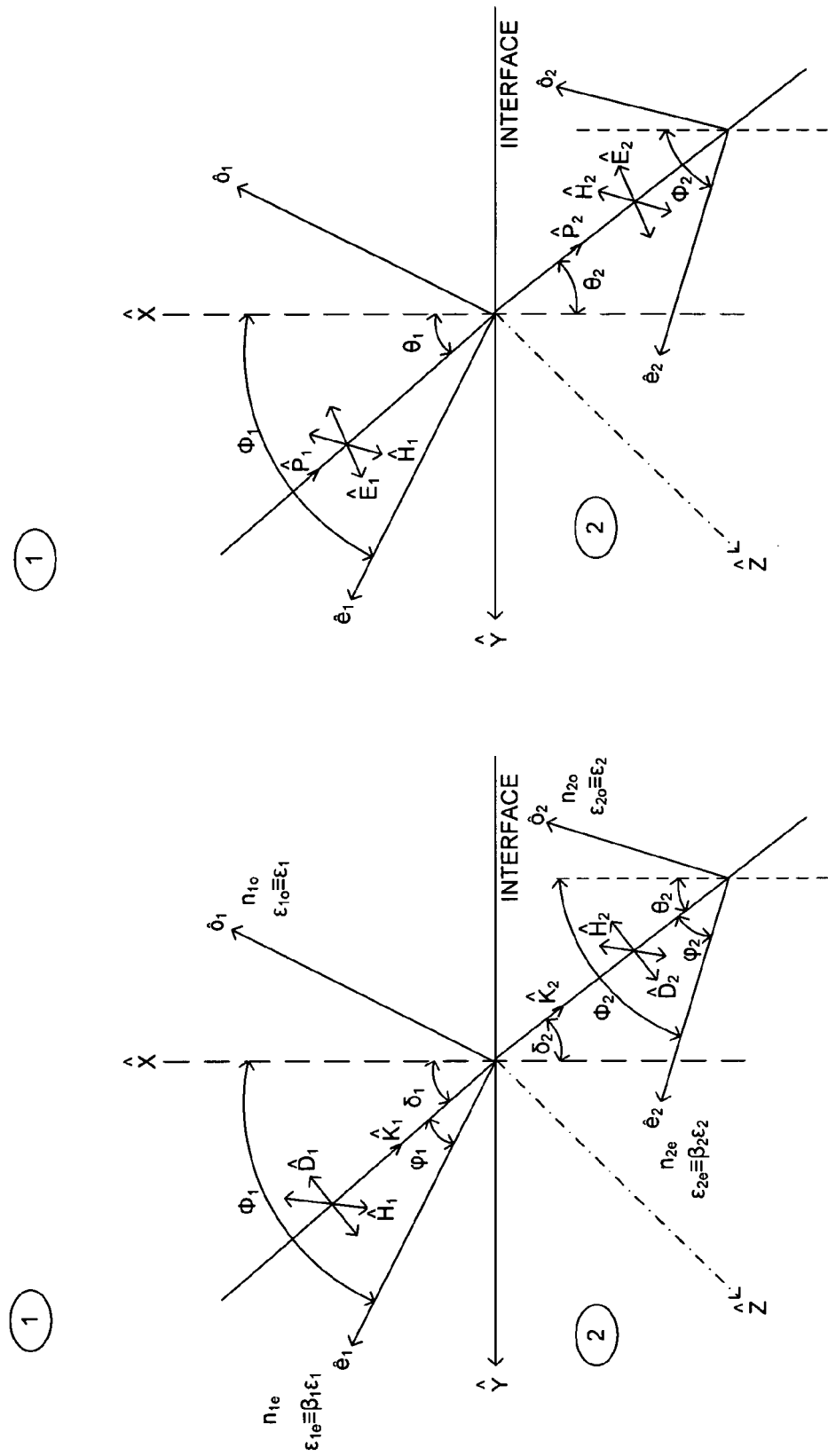
FIG. 2B is a diagram showing a boundary and nomenclature associated with beam propagation.
Figure 2C:
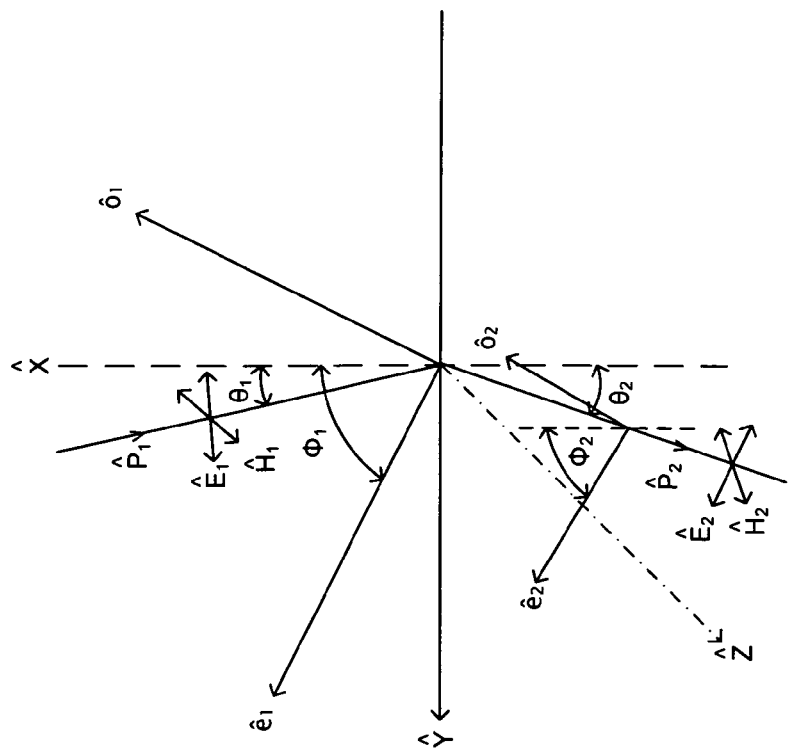
FIG. 2C is a diagram showing a boundary and nomenclature associated with beam propagation for negative refraction.
Figure 2C:
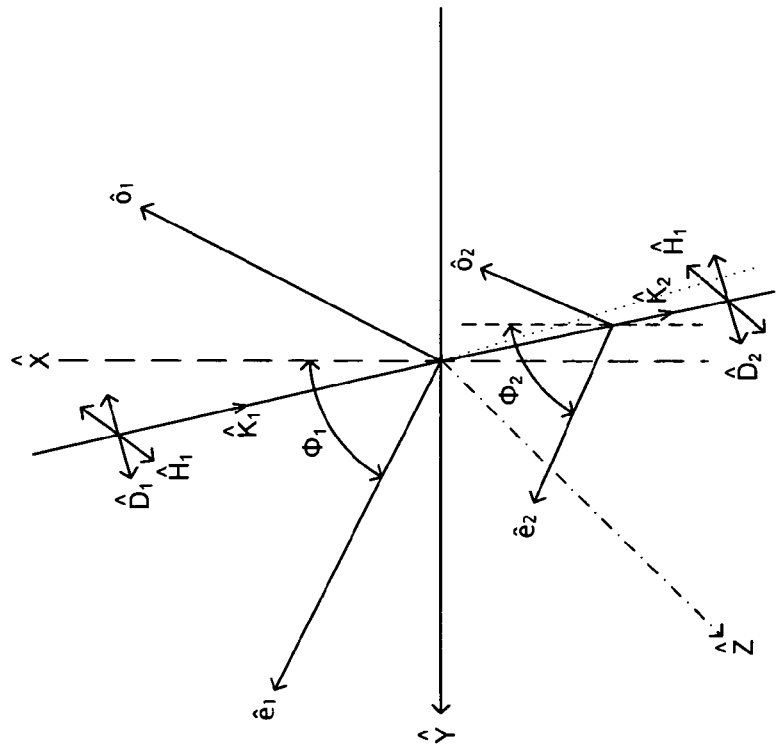

As represented in FIG. 2B, k represents the magnitude of the wave number and φ represents the angle between $\overline{k}$ and the principal axis of the respective material 302 or 308. The Poynting vector $\overline{P}$ is defined in the usual way by, $$\overline{P} = \overline{E} \times \overline{H}.$$

For reflectionless refraction to occur, a wave incident on the boundary is completely transmitted from the first medium 302 to the second medium 308, and no portion of the wave is reflected back into the first medium 302. This implies a set of continuity equations at the boundary. Among these are:

$$\hat{z} \cdot \overline{H}_1 = \hat{z} \cdot \overline{H}_2$$

$$\hat{y} \cdot \overline{E}_1 = \hat{y} \cdot \overline{E}_2$$

$$\hat{y} \cdot \overline{k}_1 = \hat{y} \cdot \overline{k}_2$$

For the geometry in FIG. 2B, these can be written as:

$$\frac{1}{\beta_2 \epsilon_2}\{\beta_2 \cos\phi_2 d_2 + \sin\phi_2 h_2\} = \frac{1}{\beta_1 \epsilon_1}\{\beta_1 \cos\phi_1 d_1 + \sin\phi_1 h_1\}$$

$$\sin\phi_2 d_2 - \cos\phi_2 h_2 = \sin\phi_1 d_1 - \cos\phi_1 h_1$$

using:

$$d_1 = k_1 \cos\phi_1, h_1 = k_1 \sin\phi_1, d_2 = k_2 \cos\phi_2, h_2 = k_2 \sin\phi_2$$

Satisfying the dispersion relation in each medium produces:

$$\frac{1}{\beta_2 \epsilon_2}(\beta_2 d_2^2 + h_2^2) = \frac{1}{\beta_1 \epsilon_1}(\beta_1 d_1^2 + h_1^2).$$

The above equations are satisfied for arbitrary incident angles (in the $\hat{x},\hat{y}$ plane) under the following conditions:

$$\beta_1 \varepsilon_1^2 = \beta_2 \varepsilon_2^2$$

$$\sqrt{\beta_1} \cos^2 \phi_1 + \frac{1}{\sqrt{\beta_1}} \sin^2 \phi_1 = \sqrt{\beta_2} \cos^2 \phi_2 + \frac{1}{\sqrt{\beta_2}} \sin^2 \phi_2$$

If the first medium 302 is isotropic, then $\beta_1 = 1$, and the condition that $\beta_1 \varepsilon_1^2 = \beta_2 \varepsilon_2^2$ reduces to $\varepsilon_1 = \sqrt{\beta_2 \varepsilon_2^2}$.

While the embodiment described above relates to a ray traveling from an isotropic medium to an anisotropic medium, propagation in the opposite direction (i.e., from an anisotropic medium to an isotropic medium) may also be within the scope of the invention.

In another embodiment, both the first medium 302 and the second medium 308 are anisotropic in the x̂,ŷ plane, though they are different media. However, the two media are selected such that the geometric means of their ordinary and extraordinary indices of refraction are substantially equal, as can be represented by:

$$n_{1o} n_{1e} = n_{2o} n_{2e}$$

or, symmetrically:

$$\beta_1 \varepsilon_1^2 = \varepsilon_2 \varepsilon_2^2.$$

The analysis for this circumstance is the more general portion of the analysis above, though not simplified by assuming the first medium 302 is isotropic. Note that this approach is not necessarily limited to cases where the permittivity is symmetrical. That is, one or both of the materials need not be uniaxial or isotropic. Instead, the approach may be generalized to cover materials where the permittivity tensors are not limited to those corresponding to uniaxial or isotropic materials. In one particularly interesting case one or both of the materials may include biaxial materials. The biaxial materials may be naturally occurring or manmade materials.

One skilled in the art will recognize that many naturally occurring media of different material types will not have equal geometric means of their ordinary and extraordinary indices of refraction. In part because the above relationships do not necessarily require that the two media be of the same material, this aspect may be reduced somewhat. For example, the index of refraction of some man-made materials can be controlled to some extent. This ability can be used to more closely satisfy the relationships described above. Moreover, in some materials, the ordinary and/or index of refraction may depend upon the exterior circumstances, such as applied magnetic or electrical fields.

Further, one skilled in the art will recognize that extremely precise control of the index of refraction may be difficult, and that many of the approaches or benefits described herein may be realized by substantially complying with the geometric mean and other relationships of the above equations, rather than exactly satisfying the relationships.

Figure 4:
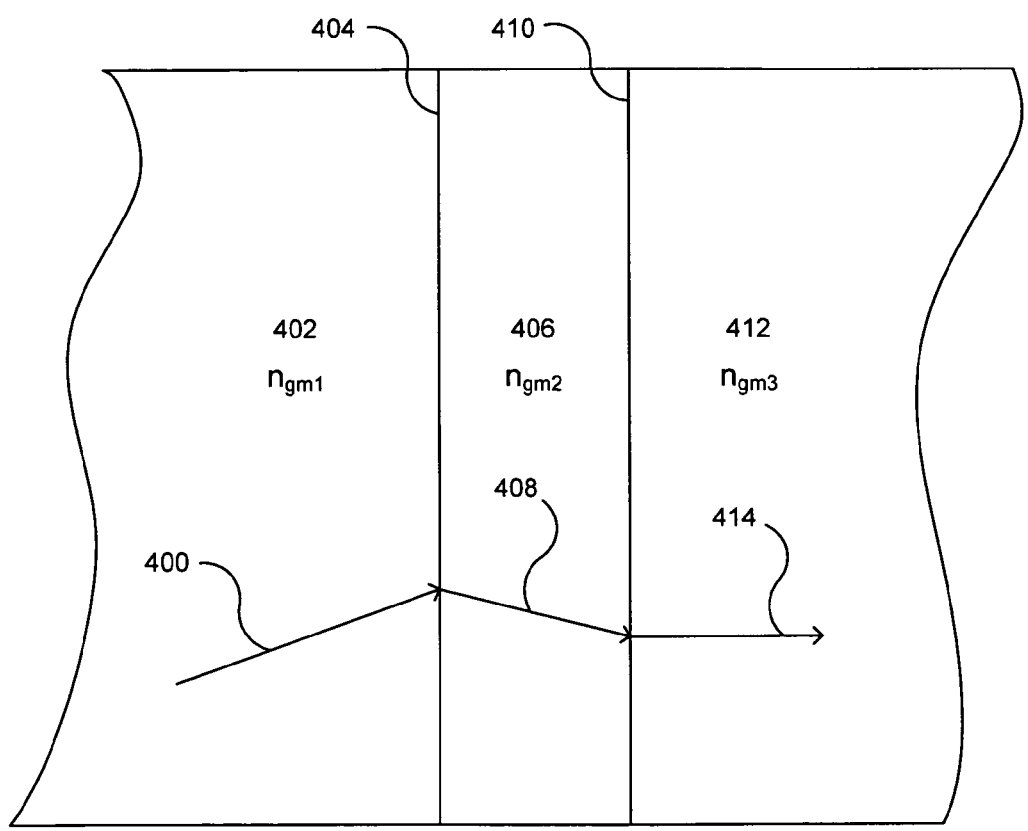
FIG. 4 is a representation of a three layer structure with a ray propagating through two interfaces between the layers.

The above approach is not limited to a single boundary between two materials. For example, as shown in FIG. 4, a lightwave 400 traveling through a first medium 402 crosses a boundary 404 and enters a second medium 406. The lightwave 400 produces a refracted wave 408 that propagates through the second medium 406 to a boundary 410. At the boundary 410, the refracted wave 408 enters a third medium 412 to produce a second refracted wave 414. At each of the boundaries 404, 410, the amount of energy reflected depends upon the relative indices of refraction on opposite sides of the boundary. At the first boundary 404, the geometric mean of the ordinary and extraordinary indices of refraction $n_{1o}$, $n_{1e}$ in the first medium 402 equals the geometric mean of the ordinary and extraordinary indices of refraction $n_{2o}$, $n_{2e}$ in the second medium 406.

Similarly, at the second boundary 410, the geometric mean of the ordinary and extraordinary indices of refraction $n_{2o}$, $n_{2e}$ in the second medium 406 equals the geometric mean of the ordinary and extraordinary indices of refraction $n_{3o}$, $n_{3e}$ of the third medium 412.

Figure 5:
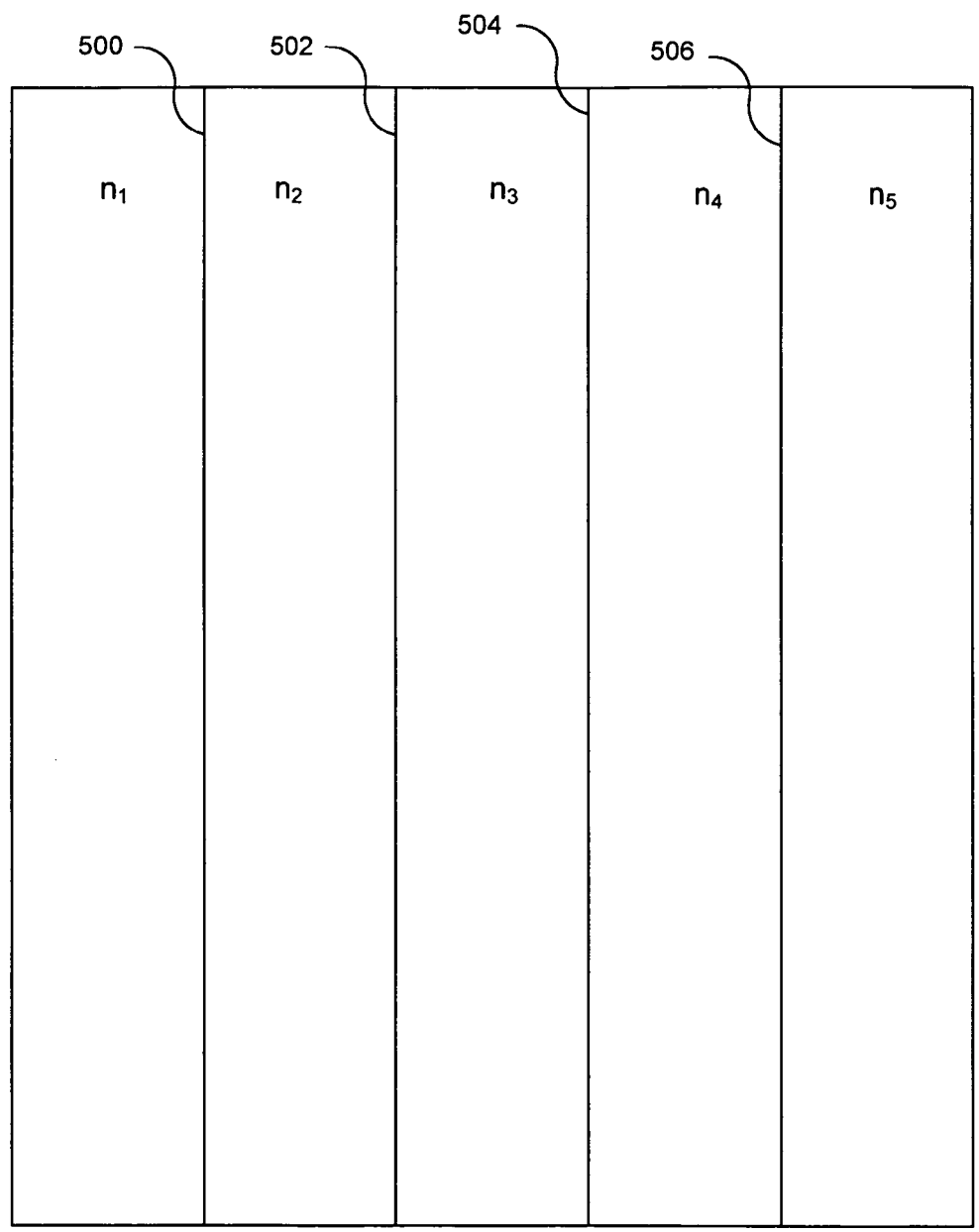
FIG. 5 is a representation of a structure having five layers, each having a respective index of refraction.
Figure 6:
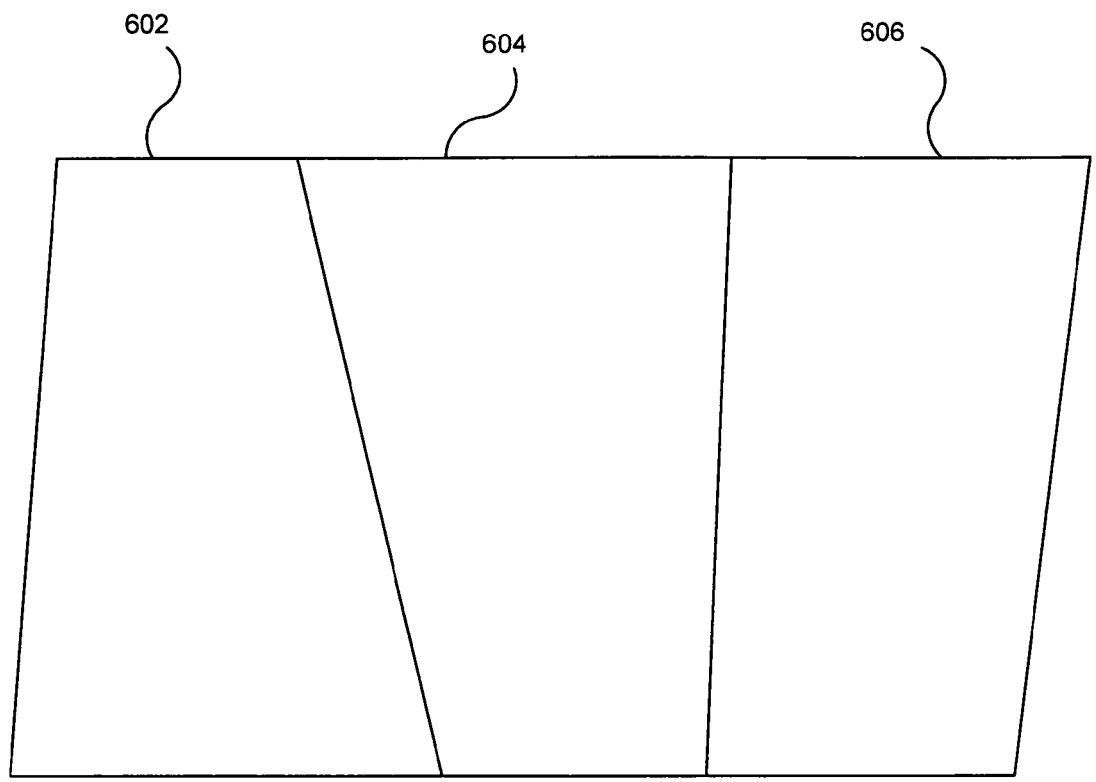
FIG. 6 is a side view of a stack of three materials having non-uniform thicknesses.

The above approach may be extended to a larger number of layers, as represented by FIG. 5. Once again, the geometric means of the indices of refraction on opposite sides of boundaries 500, 502, 504, 506 are substantially equal. While the layers in FIG. 5 are represented as rectangular and having uniform thickness, the approach here is not necessarily so limited. For example, the thickness of the layers may vary from layer to layer. Further, individual layers may have non-uniform thicknesses, as represented by the trio of wedges 602, 604, 606 shown in FIG. 6.

Figure 7:
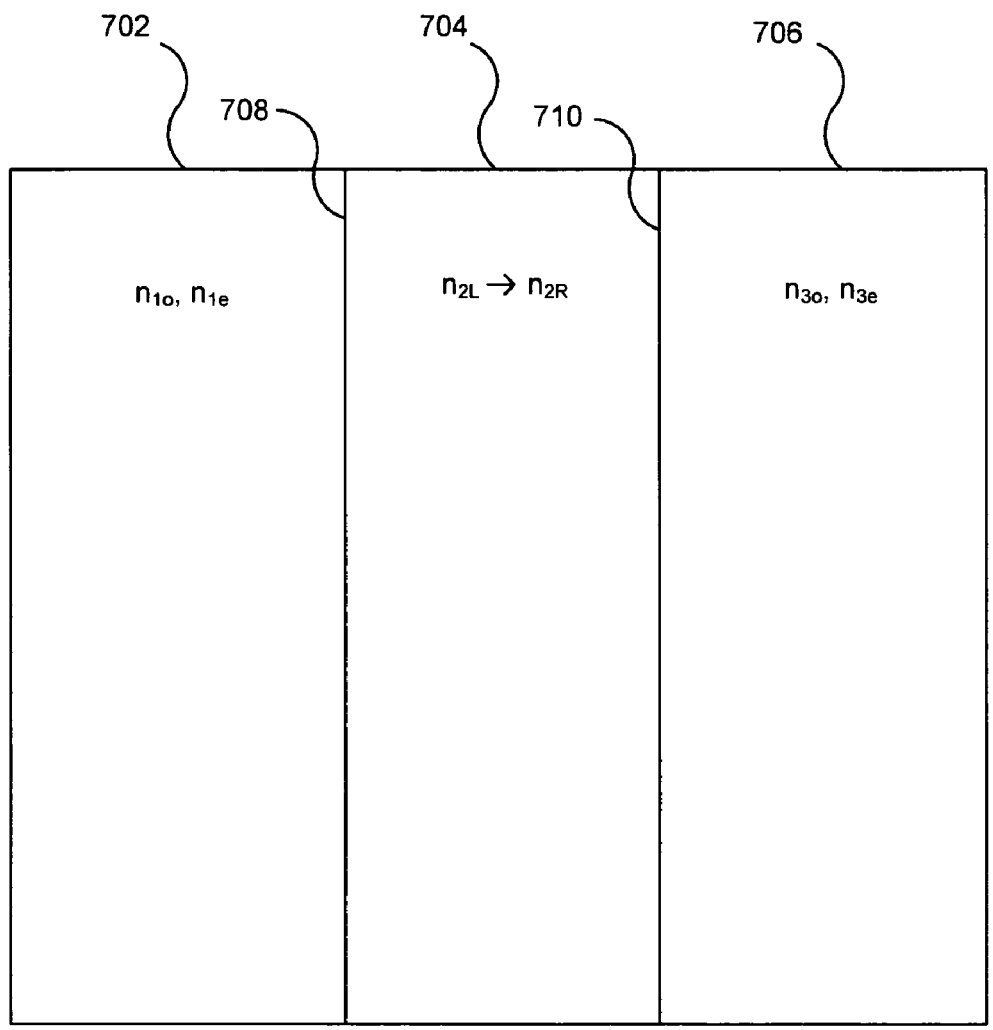
FIG. 7 is a side view of a stack of three materials, where the central material has a graded index of refraction.

In still another approach, presented in FIG. 7, a first section of material 702 has an ordinary index of refraction $n_{1o}$ and an extraordinary index of refraction $n_{1e}$. A second section of material 704 abuts the first material 702 and defines a first interface 708. The second section of material 704 has a gradient index of refraction that begins at a left index of refraction $n_{2L}$ and changes to a right index of refraction $n_{2R}$. This discussion assumes that the second material is isotropic for clarity of presentation, however, the embodiment is not necessarily so limited. In some applications, it may be desirable for the second material 704 to be a gradient index, anisotropic material. This would likely be achieved with manmade materials.

A third material 706 abuts the second material 704 and defines a second interface 710. The third material 706 has an ordinary index of refraction $n_{3o}$ and an extraordinary index of refraction $n_{3e}$. In this structure, the second material 704 provides a transitional layer between the first material 702 and the third material 706. For index matching at the first interface, the left index of refraction $n_{2L}$ equals the geometric mean of the first ordinary index of refraction $n_{1o}$ and the first extraordinary index of refraction $n_{1e}$. Similarly, for index matching at the second interface, the right index of refraction $n_{2R}$ equals the geometric mean of the third ordinary index of refraction $n_{3o}$ and the third extraordinary index of refraction $n_{3e}$. As above, the approach may be extended to more layers or may be combined with other embodiments to address design considerations. For example, a structure may include more than three layers and may have non-parallel faces. In another aspect, an embodiment may include a series of layers or discrete elements to form a complex element. One of skill in the art can adapt known optical design techniques or computer based programs to design optical elements implementing one or more aspects of the herein-described embodiments. Particular cases may include a series of optical elements for enlarging, transmitting, or aligning an image, such as in microscopes, display viewing optics, or photolithography.

Moreover, one or more of the layers or portions of the layers may include a polarization rotating structure. Such structures are known and may be passive or active. In active polarization rotating structures, the amount of polarization rotation can be controlled externally, by for example, application of electric fields. In such approaches, either active or passive, waves propagating through the rotating structure can rotate in polarization in an amount determined by the structure and/or and applied input, thereby providing an additional degree of design freedom. In one respect, from the point of view of wave polarization, the materials following the rotational structure are effectively rotated relative materials preceding the rotating structure.

Figure 8:
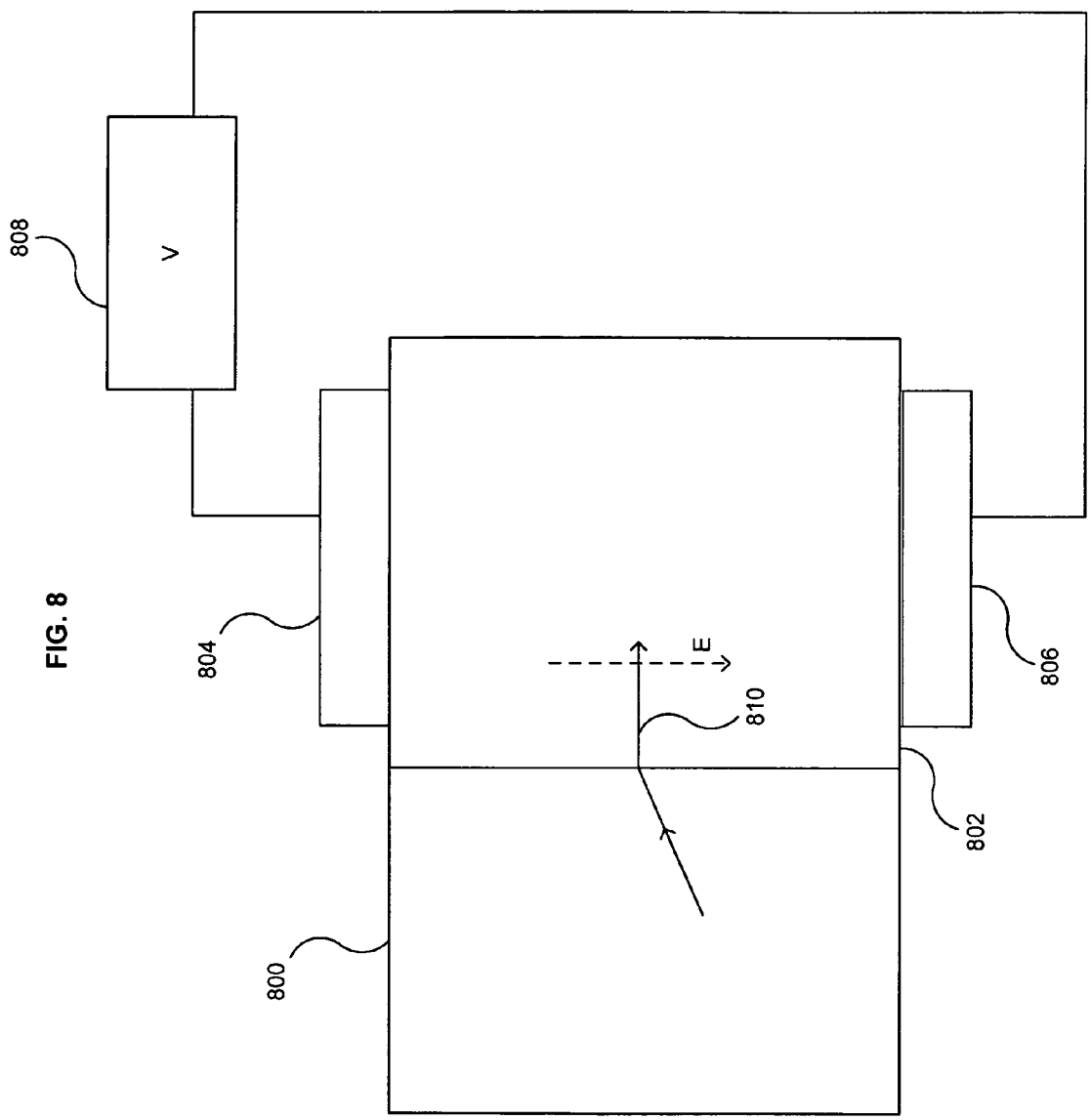
FIG. 8 is a diagrammatic representation of a pair of materials, where one of the materials is a dynamically controllable material.

While the previous embodiments have been described in the context of a constant set of refractive indices, dynamic adjustment may also be within the scope of the invention. For example, as shown in FIG. 8, a first material 800 abuts a second, dynamically controllable material 802. In one embodiment, the dynamically controllable material 802 is an electrooptic material. As is known, electrooptic materials, such as LiNbO$_3$, have indices of refraction that depend upon applied electric fields. As represented by a pair of electrodes 804 and 806 and a voltage source 808, an electric field E may be applied to the second material 802. While the electric field E is presented as being applied transverse to a propagating ray 810, other directional applications may be appropriate depending upon the electro optic tensor of the particular material. The dynamically varied index of refraction also need not be constant. For example, in an electrooptic device, the electric field can be varied spatially to produce a gradient.

Figure 9:
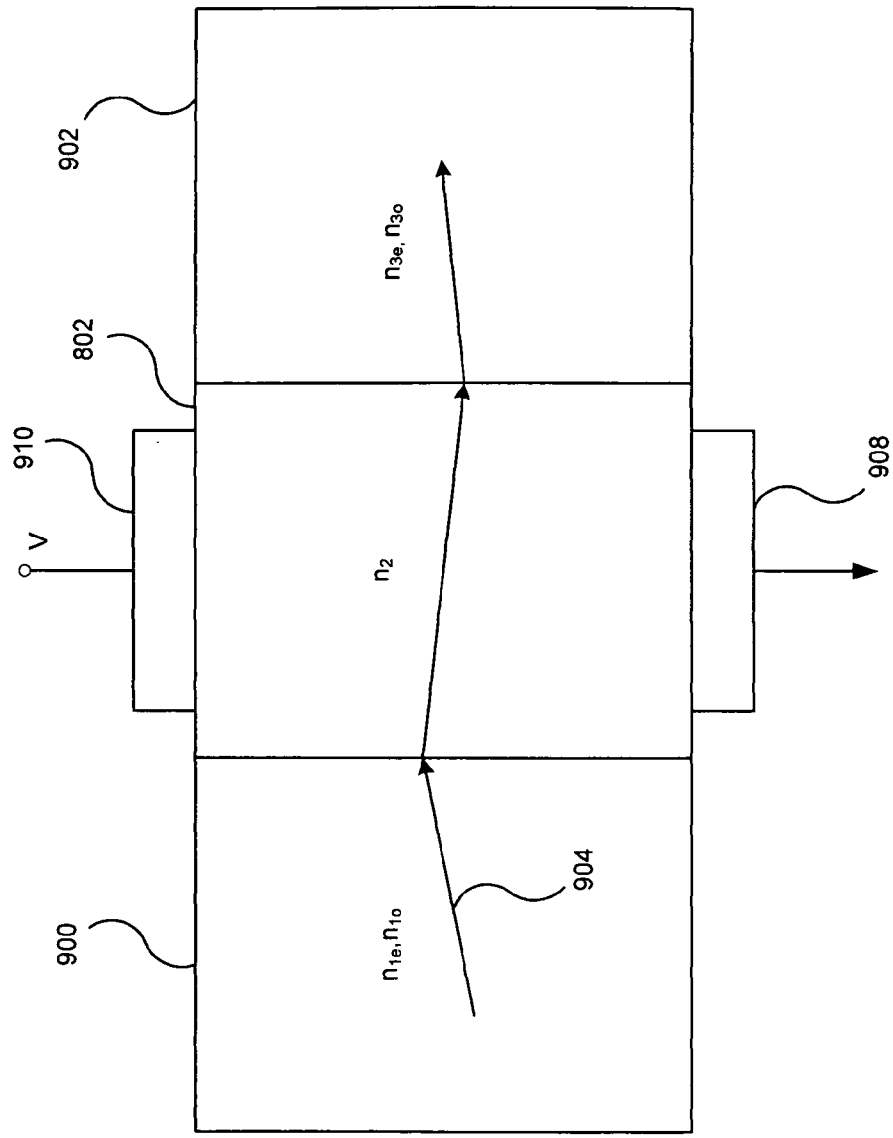
FIG. 9 is a diagrammatic representation of a stack of materials where the central material is a dynamically controllable material.

In another embodiment, the dynamically controllable material 802 may be a polarization rotating material, as represented in the structure of FIG. 9. In this structure, the dynamically controllable material 802 provides a transitional layer between a first material 900 and a third material 902. The first material 900 has an ordinary index of refraction $n_{1o}$ and an extraordinary index of refraction $n_{1e}$ whose geometric mean matches that of the ordinary and extraordinary indices of refraction $n_{3o}$, $n_{3e}$ of the third material 902. However, for proper matching of the materials, it may be desirable that the polarization of light 904 exiting the first material 900 be rotated before entering the third material 902. The dynamically controllable material 802 can rotate a polarization of the light 904, responsive to an applied electric field E, represented by a voltage source V and respective electrodes 910, 908. For example, dynamic control may be used to establish conditions for substantially reflectionless refraction between the dynamically controllable material 802 and the first or second materials 900, 902.

Alternatively, the index of refraction or other material property of the dynamically controllable material 802 may be varied to direct the propagating energy out of plane. It should be noted that the layers of materials described herein are shown with exemplary aspect ratios and thicknesses. However, the invention is not so limited. The materials may be made almost arbitrarily thin, on the order of one or a few wavelengths in many applications, thereby allowing the optical elements and structures described herein to be very thin.

Although the embodiment described above with respect to polarization rotation presumes that the first and third materials have the same geometric mean of their indices of refraction, it may be useful in some applications to have the geometric means be different. One approach to this is to combine the transitional index approach of FIG. 7 or the active control approach of FIG. 8 to rotate polarization and transition between differing geometric mean index of refractions. Similarly, the approaches of FIGS. 7 and 8 can be combined to allow active control and transition.

Note that while the dynamically controllable materials of FIGS. 8 and 9 respond to electric fields, other dynamically controllable materials may be within the scope of the invention. For example, some materials respond to magnetic fields, temperature, optical energy, stress, or a variety of other inputs. Moreover, the dynamically controllable materials may be incorporated into other structures including the structures described earlier with respect to FIGS. 5 and 6.

In addition to linear stacks of materials, other configurations may be within the scope of the invention. For example, as represented diagrammatically in FIG. 10, a series of wedges 1000, 1002, 1004, 1006, 1008, 1010, 1012, may be arranged in a geometric structure, such as a generally circular structure or generally polygonal structure. While the structure of FIG. 10 includes seven wedges for clarity of presentation, the actual number in arrangement of wedges may be larger or smaller depending upon the desired result and the amount of refraction at each interface.

Figure 10:
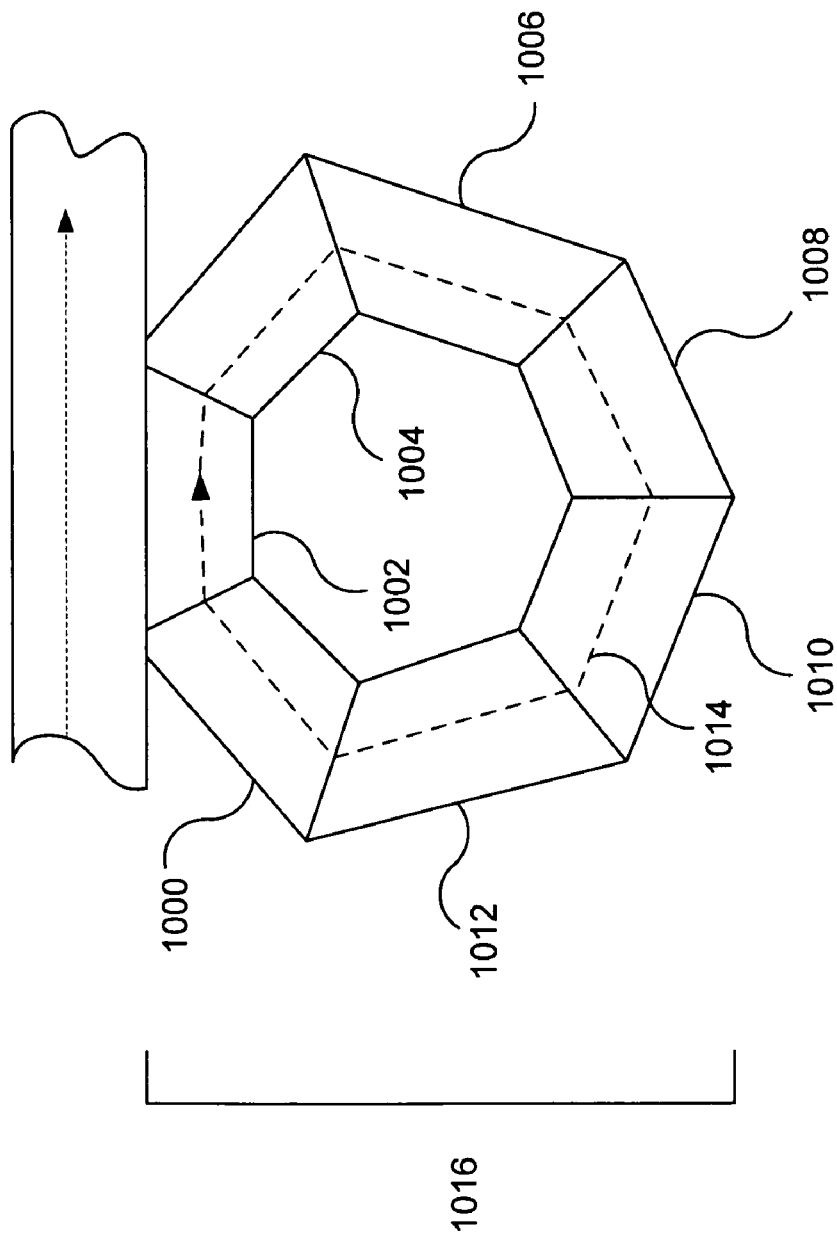
FIG. 10 is a diagrammatic representation of a circulator and waveguide.

In the structure of FIG. 10, the refraction at the interfaces is selected such that a ray 1014 propagating through one of the wedges completes a relatively circular loop. The polygonal structure 1016 thus forms a resonator ring. Optical resonators are useful in a variety of applications, including as resonators for lasers, filters, gyroscopes, or switches as described, for example, in U.S. Pat. No. 6,411,752 entitled VERTICALLY COUPLED OPTICAL RESONATOR DEVICES OVER A CROSS-GRID WAVEGUIDE ARCHITECTURE to Little, et al.; WO0048026A1 entitled OPTICAL WAVEGUIDE WAVELENGTH FILTER WITH RING RESONATOR AND 1×N OPTICAL WAVEGUIDE WAVELENGTH FILTER to Chu, et al., published Aug. 17, 2000; U.S. Pat. No. 6,052,495 entitled RESONATOR MODULATORS AND WAVELENGTH ROUTING SWITCHES to Little, et al.; U.S. Pat. No. 6,603,113 to Numai entitled GYRO COMPRISING A RING LASER IN WHICH BEAMS OF DIFFERENT OSCILLATION FREQUENCIES COEXIST AND PROPAGATE IN MUTUALLY OPPOSITE CIRCULATION DIRECTIONS, DRIVING METHOD OF GYRO, AND SIGNAL DETECTING METHOD; and in Liu, Shakouri, and Bowers, "Wide Tunable Double Ring Resonator Tuned Lasers," IEEE Photonics Technology Letters, Vol. 14, No. 5, (May 2002) each of which is incorporated herein by reference.

Figure 11:
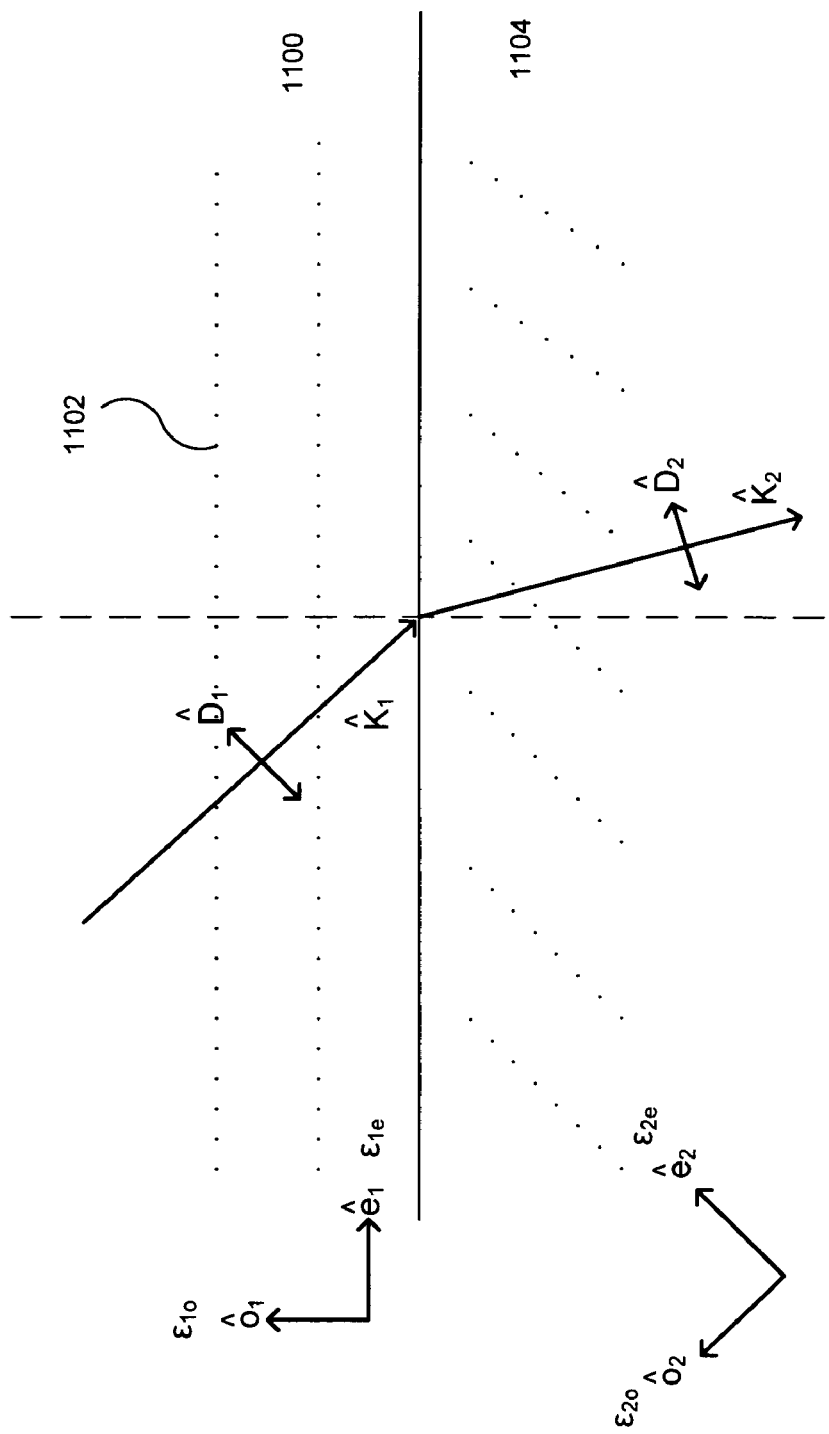
FIG. 11 is a representation of a manmade material having selected electromagnetic properties.

While the embodiments described above focus primarily on optical elements and incorporate optical terminology in many cases, the techniques, structures, and other aspects according to the invention are not so limited. For example, in some applications, it may be desirable to implement structures configured for other portions of the electromagnetic spectrum. For example, as shown in FIG. 11, the input energy may be radio frequency (RF). In this structure, a first material 1100 is a manmade structure including periodically positioned RF structures 1102. The first material has dielectric constants $\in_{1o}$, $\in_{1e}$ corresponding respectively to its ordinary and extraordinary axes. The first material 1100 adjoins a second material 1104 having dielectric constants $\in_{2o}$, $\in_{2e}$ corresponding respectively to its ordinary and extraordinary axes. Manmade materials having anisotropic sets of dielectric constants are known. For example, such materials have been shown to operate at around 10 GHz.

In the embodiment of FIG. 11, the adjoining materials are such that they satisfy the equation:

$$\beta_1 \varepsilon_1^2 = \beta_2 \varepsilon_2^2$$

$$\sqrt{\beta_1}\cos^2\phi_1 + \frac{1}{\sqrt{\beta_1}}\sin^2\phi_1 = \sqrt{\beta_2}\cos^2\phi_2 + \frac{1}{\sqrt{\beta_2}}\sin^2\phi_2$$

In one embodiment, each of the materials has a respective anisotropic dielectric constant, such that:

$$\in_{1o} \neq \in_{1e}$$

and $$\in_{2o} \neq \in_{2e}$$

In another embodiment, the first material is isotropic, such that:

$$\in_{1o} = \in_{1e}$$

As described with respect to previous embodiments, the electromagnetic wave, though shown propagating in one direction may propagate in the opposite direction and still satisfy the above configuration, for many structures. While the descriptions above have generally referred to specific materials or manmade analogs, in some applications one or more layers of isotropic materials may be air, vacuum, gas, liquid or other substances, including substances having a unity index of refraction. In such cases, the anisotropic material may have an index less than unity. For example, a material having aligned metal fibers in an isotropic dielectric may have an extraordinary index less than 1. The net geometric mean of the material in certain orientations can then equal substantially 1.

While the exemplary embodiments of FIGS. 1-11 are presented with reference to optical systems and terminology, those skilled in the art will recognize that at least a portion of the devices and/or processes described herein can apply to other types of systems, including RF, X-ray, or other electromagnetic elements, processes, or systems.

The foregoing detailed description has set forth various embodiments of the devices and/or processes via the use of block diagrams, diagrammatic representations, and examples. Insofar as such block diagrams, diagrammatic representations, and examples contain one or more functions and/or operations, it will be understood as notorious by those within the art that each function and/or operation within such block diagrams, diagrammatic representations, or examples can be implemented, individually and/or collectively, by a wide range of hardware, materials, components, or virtually any combination thereof.

Those skilled in the art will recognize that it is common within the art to describe devices and/or processes in the fashion set forth herein, and thereafter use standard engineering practices to integrate such described devices and/or processes into elements, processes or systems. That is, at least a portion of the devices and/or processes described herein can be integrated into an optical, RF, X-ray, or other electromagnetic elements, processes or systems via a reasonable amount of experimentation.

Those having skill in the art will recognize that a typical optical system generally includes one or more of a system housing or support, and may include a light source, electrical components, alignment features, one or more interaction devices, such as a touch pad or screen, control systems including feedback loops and control motors (e.g., feedback for sensing lens position and/or velocity; control motors for moving/distorting lenses to give desired focuses). Such systems may include image processing systems, image capture systems, photolithographic systems, scanning systems, or other systems employing optical, RF, X-ray or other focusing or refracting elements or processes.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

While particular embodiments of the present invention have been shown and described, it will be understood by those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. An apparatus for interacting with electromagnetic energy, comprising:
   three or more sections in consecutive contact across two or more respective section-section interfaces, each section having a respective electromagnetic parameter different from the electromagnetic parameter of an adjacent section with at least a pair of adjacent sections having substantially different electromagnetic parameters;
   wherein the three or more sections in consecutive contact are oriented so of that each the two or more section-section interfaces consecutively transmits the electromagnetic energy with substantially zero reflection even when the electromagnetic parameters of the adjacent sections on either side of the section-section interface are substantially different.

2. The apparatus of claim 1, wherein one or more of the sections includes a manmade material.

3. The apparatus of claim 1, wherein the electromagnetic parameters include at least one of refractive index, permittivity, or permeability.

4. The apparatus of claim 1, wherein the electromagnetic parameters include permittivity.

13

5. The apparatus of claim 4 wherein
a. a first section of the three or more sections includes a first pair of permittivities, each corresponding to the other by a ratio $\beta_1$; and
b. a second section of the three or more sections in contact with the first section includes a second pair of permittivities, each corresponding to the other by a ratio $\beta_2$;
c. wherein the first and second sections include principal axes oriented such that $$\sqrt{\beta_1}\cos^2\phi_1 + \frac{1}{\sqrt{\beta_1}}\sin^2\phi_1 = \sqrt{\beta_2}\cos^2\phi_2 + \frac{1}{\sqrt{\beta_2}}\sin^2\phi_2.$$

6. The apparatus of claim 1, wherein the three or more sections are oriented to transmit the electromagnetic energy through each of the two or more section-section interfaces with a power loss of energy that is ideally zero.

7. The apparatus of claim 1, wherein the three or more sections are oriented to transmit the electromagnetic energy through the two or more section-section interfaces with a power loss of energy that is that is on the order of $10^{-4}$ or less.

8. The apparatus of claim 1, wherein the three or more sections are oriented to transmit the electromagnetic energy through the two or more section-section interfaces with a power loss of energy that is only due to imperfections in the sections.

9. The apparatus of claim 1, wherein the three or more sections are oriented to transmit the electromagnetic energy through the two or more section-section interfaces with no reflection at the interfaces visible to the naked eye.

10. A method of controlling propagation of RF energy comprising:
receiving input RF energy at a selected frequency; and
substantially refracting at least a portion of the input radio frequency (RF) energy at the selected frequency with substantially zero reflection.

11. The method of claim 10 wherein refracting at least a portion of the input RF energy at the selected frequency, substantially reflection free includes:

14 intercepting the at least a portion of the input RF energy with a material having an anisotropic dielectric constant at the selected frequency.

12. The method of claim 11 wherein refracting at least a portion of the input RF energy at the selected frequency, substantially reflection free further includes:
intercepting the at least a portion of the input RF energy with a material having a dielectric constant at the selected frequency that is a function of the anisotropic dielectric constant at the selected frequency.

13. The method of claim 12 wherein intercepting the at least a portion of the input RF energy with a material having a dielectric constant at the selected frequency that is a function of the anisotropic Dr. constant at the selected frequency includes:
intercepting the at least a portion of the input RF energy with a material having a dielectric constant that satisfies the relationship:

$$\beta_1\varepsilon_1^2 = \beta_2\varepsilon_2^2$$
$$\sqrt{\beta_1}\cos^2\phi_1 + \frac{1}{\sqrt{\beta_1}}\sin^2\phi_1 = \sqrt{\beta_2}\cos^2\phi_2 + \frac{1}{\sqrt{\beta_2}}\sin^2\phi_2$$

where:
$\in_1$ is a dielectric constant of the first material relative to its principal material axis; $\in_2$ is a dielectric constant of the second material relative to its principal material axis;
$\beta_1\in_1$ is a dielectric constant of the first anisotropic material relative to a second material axis; $\beta_2\in_2$ is a dielectric constant of the second material relative to a second material axis; and $\phi_1$ is an orientation angle of the principal material axis of the first anisotropic material and $\phi_2$ is an orientation angle of the principal material axis of the second material in a region adjoining the second surface.

* * * * *

UNITED STATES PATENT AND TRADEMARK OFFICE
CERTIFICATE OF CORRECTION

| | |
|---|---|
| PATENT NO. | : 7,903,334 B2 |
| APPLICATION NO. | : 12/315759 |
| DATED | : March 8, 2011 |
| INVENTOR(S) | : Hyde et al. |

It is certified that error appears in the above-identified patent and that said Letters Patent is hereby corrected as shown below:

On title page 1, please add:
--Related U.S. Application Data: Continuation of Application No. 11/607,261, filed on December 1, 2006 and Application No. 12/228,555, filed on August 13, 2008.--

Signed and Sealed this
Sixteenth Day of August, 2011

David J. Kappos
*Director of the United States Patent and Trademark Office*